(12) United States Patent
Han et al.

(10) Patent No.: US 9,975,204 B2
(45) Date of Patent: May 22, 2018

(54) LASER MARKING SYSTEM FOR COIL SPRINGS

(71) Applicant: YOUNGHEUNG IRON & STEEL CO. LTD., Boryeong-si (KR)

(72) Inventors: Jae Yeol Han, Ansan (KR); Won Gyu Song, Ansan (KR)

(73) Assignee: YOUNGHEUNG IRON & STEEL CO. LTD., Boryeong-Si (KR)

( * ) Notice: Subject to any disclaimer, the term of this patent is extended or adjusted under 35 U.S.C. 154(b) by 196 days.

(21) Appl. No.: 14/627,324

(22) Filed: Feb. 20, 2015

(65) Prior Publication Data

US 2015/0239282 A1  Aug. 27, 2015

(30) Foreign Application Priority Data

Feb. 25, 2014  (KR) .......................... 10-2014-0021671

(51) Int. Cl.
*B23K 26/00* (2014.01)
*B21C 1/00* (2006.01)
*B23K 26/08* (2014.01)

(52) U.S. Cl.
CPC .................................. *B23K 26/083* (2013.01)

(58) Field of Classification Search
CPC .................................................... B23K 26/083
USPC .............. 219/121.68, 121.69, 121.82, 121.6,
219/121.73, 121.75, 158, 159, 160, 161,
219/228, 44.3, 269; 347/224, 247, 256,
347/258, 255, 229; 29/33 F, 825;
359/202, 203, 204; 101/4, 35, 36, 37,
101/172, 426

See application file for complete search history.

(56) References Cited

U.S. PATENT DOCUMENTS

| | | | | |
|---|---|---|---|---|
| 3,925,785 A * | 12/1975 | Firtion | ............... | B23K 26/0838 |
| | | | | 185/37 |
| 5,662,821 A * | 9/1997 | Ruckl | ............... | B23K 26/0823 |
| | | | | 101/128.4 |
| 5,821,497 A * | 10/1998 | Yamazaki | ............ | B23K 26/066 |
| | | | | 219/121.68 |
| 6,751,847 B1 * | 6/2004 | Brey | ................ | G01R 33/34007 |
| | | | | 29/602.1 |
| 7,908,968 B2 * | 3/2011 | McCoin | .................... | B44C 1/02 |
| | | | | 101/476 |
| 2002/0100308 A1 * | 8/2002 | Wegener | ................ | B21D 25/02 |
| | | | | 72/295 |

(Continued)

*Primary Examiner* — Dana Ross
*Assistant Examiner* — Ket D Dang
(74) *Attorney, Agent, or Firm* — Novick, Kim & Lee, PLLC; Jae Youn Kim

(57) ABSTRACT

A laser marking system for coil springs includes: a support unit; a first fixing jig coupled to the support unit and contacting one surface of a coil spring; a second fixing jig located at a side facing the first fixing jig and contacting an surface opposite to the surface of the coil spring; a moving unit frame connected to the support unit and to which the second fixing jig is fixed; a moving unit servo motor connected to the moving ball screw; a marking unit frame connected to the moving unit frame and configured to move forwards and rearwards towards the coil spring to perform a marking operation on the coil spring; a marking unit ball screw connected to the marking unit frame; a marking unit servo motor connected to the marking unit ball screw; and a laser marker fixing to the marking unit frame.

3 Claims, 21 Drawing Sheets

(56) References Cited

U.S. PATENT DOCUMENTS

2008/0305615 A1* 12/2008 Ueno .................. B28D 5/0011
438/463
2013/0000990 A1* 1/2013 Downie ............. E21B 17/1085
175/325.5

* cited by examiner

LASER MARKING SYSTEM FOR COIL SPRINGS

BACKGROUND OF THE INVENTION

1. Field of the Invention

The present invention relates to a laser marking system for coil springs, and more particularly relates to a laser marking system for marking letters and symbols on a coil spring used as a component of a coil spring using a laser.

2. Description of the Prior Art

The present invention relates to a marking system for coil springs by which specifications, such as a diameter and a length of a coil spring can be marked when the coil spring is formed. In general, various coil springs having different diameters and lengths are manufactured and used according to purposes thereof.

Specifications of a spring, such as diameter, length, and in-use period, are displayed to distinguish the the coil spring from other coil springs, and in general, traditional marks including labels or stamps are employed and marks using inkjet have recently used.

In the case of stamping, a marking operation is performed on a top or bottom surface of a coil spring by making the coil spring upright so that the marking operation may be easily carried out as illustrated in FIG. 1. The top or bottom surface of the coil spring on which the marking is performed is a part mounted on a machine or a device, and the mark may be erased due to continuous frictions with the machine or device, and accordingly, specification of the coil spring cannot be easily identified when components are replaced.

In the case of marking using an inkjet, an in-use time period of ink is so short that ink should be frequently replaced, and when the ink is not used for a predetermined time period, the ink may be solidified so that it is necessary to frequently manage the ink.

SUMMARY OF THE INVENTION

The present invention has been made in an effort to solve the aforementioned problems, and an objective of the present invention is to mark specifications of a spring, such as manufacturer and manufacturing date, as well as diameter, length, and in-use period, on a curved surface of a spring. In addition, because a marking operation can be rapidly performed by performing a non-contact type marking operation using a laser on a side surface of a coil spring and a laser is used as well, problems such as solidification of ink and replacement of ink can be solved while an inkjet is used.

In accordance with an aspect of the present invention, there is provided a laser marking system for coil springs comprising a marking apparatus, the marking apparatus including: a support unit; a first fixing jig coupled to the support unit and contacting one surface of a spring; a second fixing jig located at a side facing the first fixing jig and contacting an surface opposite to the surface of the coil spring that is fixed by the first fixing jig; a moving unit frame connected to the support unit and to which the second fixing jig is fixed such that the moving unit frame is moved forwards and rearwards towards the spring; a moving unit ball screw connected to the moving unit frame, for moving the moving unit frame forwards and rearwards; a moving unit servo motor connected to the moving ball screw, for providing power for moving the moving unit frame forwards and rearwards; a marking unit frame connected to the moving unit frame and configured to move forwards and rearwards towards the coil spring to perform a marking operation on the spring; a marking unit ball screw connected to the marking unit frame, for moving the marking unit frame forwards and rearwards; a marking unit servo motor connected to the marking unit ball screw, for providing power for moving the marking unit frame forwards and rearwards; and a laser marker fixing to the marking unit frame and configured to perform a marking operation on the spring.

The laser marking system further includes a second rotary motor coupled to the first fixing jig, for rotating the first fixing jig, and the laser marking system further includes a first escape part contacting a start part where the coil spring starts to be rotated is formed in the first fixing jig, and the first escape part of the first fixing jig contacts the start part of the coil spring such that the coil spring is rotated together while the first fixing jig is rotated.

The laser marking system further includes an arranging apparatus including: an arranging unit base; a first arranging jig fixed to the arranging unit base to contact one surface of the spring; a second arranging jig located at a site facing the first fixing jig and contacting an surface opposite to the surface of the coil spring that contacts the first arranging jig; an arranging unit moving unit to which the second arranging jig is fixed and configured to move forwards and rearwards towards the spring; an arranging unit ball screw connected to the arranging unit moving unit, for moving the arranging unit moving unit forwards and rearwards; an arranging unit servo motor connected to the arranging unit ball screw, for providing power for moving the arranging unit moving unit forwards and rearwards; an arranging unit positioning jig on which the coil spring is positioned; and a first rotary motor coupled to the first arranging jig, for rotating the first arranging jig.

A first escape part contacting a start part where the coil spring starts to be rotated is formed in the first arranging jig, and a location of the coil spring is arranged by bringing the first escape part and the start part of the coil spring into contact with each other through rotation of the first fixing jig, and the laser marking system further includes a positioning jig ball screw for driving the arranging unit positioning jig upwards and downward and a positioning jig servo motor, for preventing interference of the coil spring with the arranging unit positioning jig on which the coil spring is positioned while the coil spring is rotated.

According to the present invention, because specifications are marked on a coil spring using a laser in a non-contact fashion, production efficiency can be increased as marking speed increases as compared with an existing marking unit. Further, because specifications are marked on a curved surface of a coil spring unlike stamping by which a marking operation is performed on a planar front surface of a spring, marks are not erased even when the coil spring is circulated and is mounted to a machine or a device, so that the coil spring can be easily identified and replaced when the component is replaced. In addition, because a laser is used for marking, ink generated when the inkjet is used may be solidified and should be frequently replaced.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, an embodiment of the present invention will be described in detail with reference to the accompanying drawings.

Figure 1:
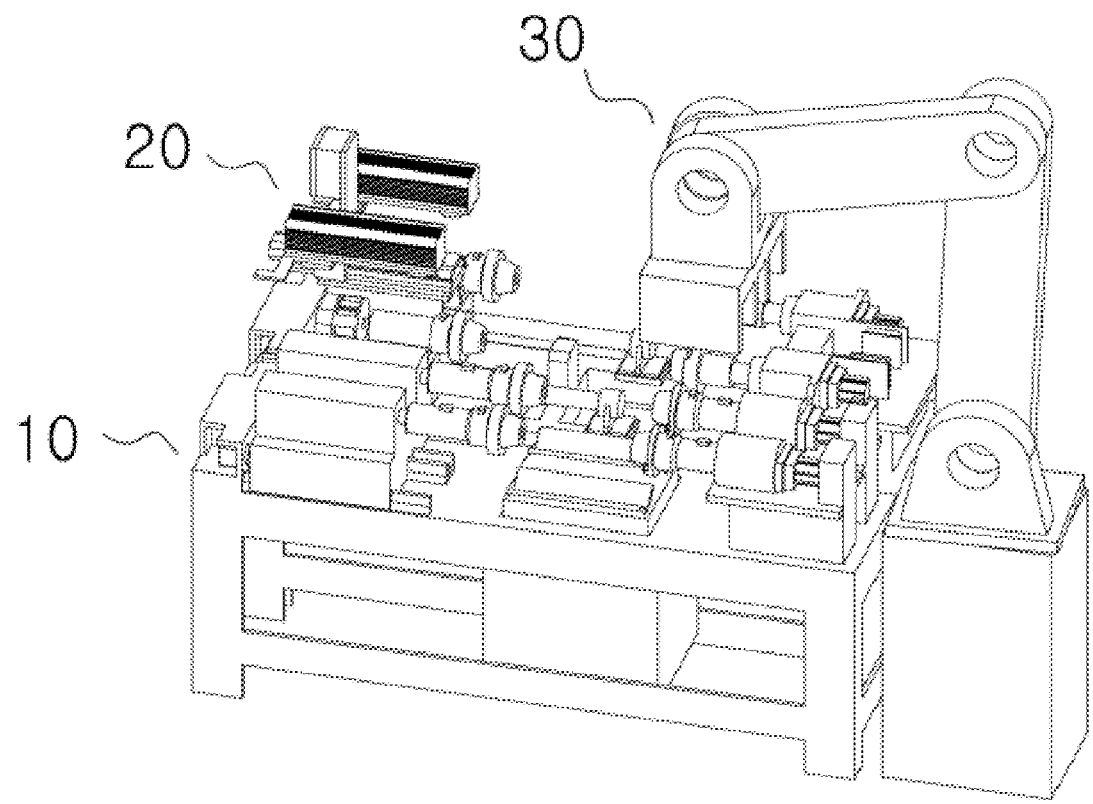
FIG. 1 is a perspective view illustrating a laser marking system for coil springs according to an embodiment of the present invention.

Referring to FIG. 1, a laser marking system for coil springs according to an embodiment of the present invention includes an arranging apparatus 10, a marking apparatus 20, and a feeding apparatus 30.

Figure 2:
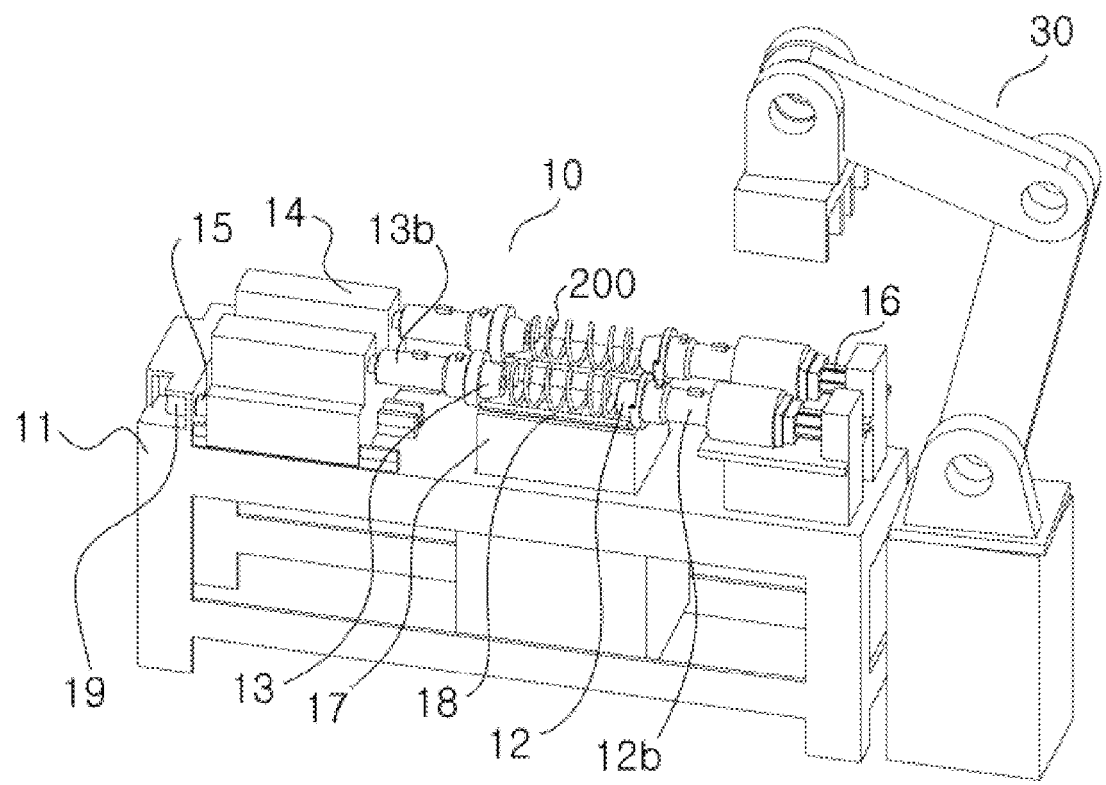
FIG. 2 is a perspective view illustrating an arranging apparatus of a laser marking system for coil springs according to an embodiment of the present invention.
Figure 8:
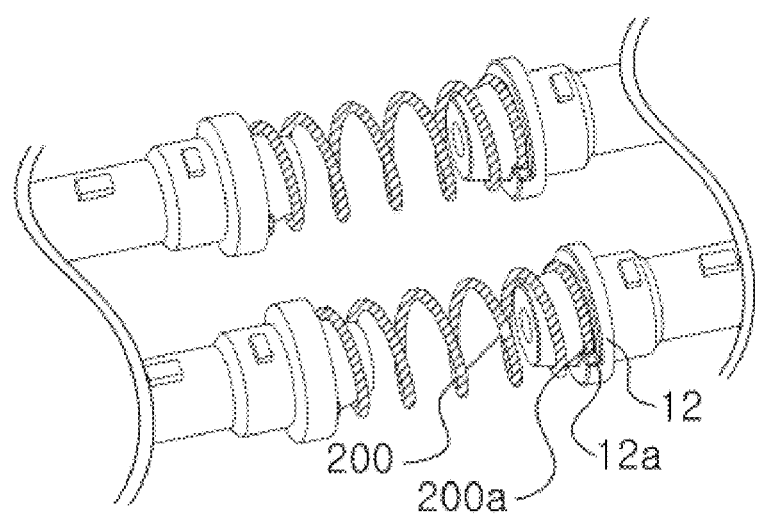
FIG. 8 is a perspective view illustrating an arranging jig and a coil spring in an arranging apparatus of a laser marking system for coil springs according to an embodiment of the present invention.
Figure 9:
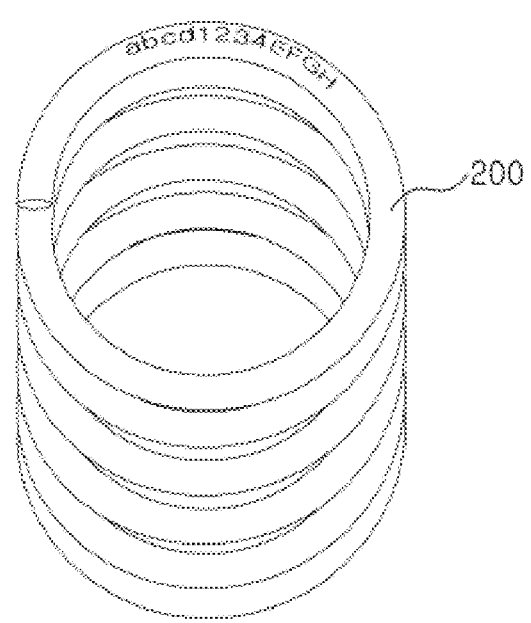
FIG. 9 is a view illustrating a marking location of a coil spring according to the related art.

Referring to FIGS. 2 and 8, the arranging apparatus 10 serves to arrange coil springs such that the locations and directions of all the coil springs 200 are the same. The arranging apparatus 10 includes an arranging unit base 11, a positioning jig driving unit connected to the arranging unit base 11, for driving the arranging unit base 11 upwards and downwards, a positioning jig servo motor 17a and a positioning jig ball screw 17b for moving the positioning jig driving unit 17 upwards and downwards, an arranging unit positioning jig 18 coupled to the positioning jig driving unit 17, for positioning a coil spring 200, a first arranging jig 12 fixed to the arranging unit base 11 and adhered to one surface of the coil spring 200, a first arranging rod 12b connecting the first arranging jig 12 to the arranging unit base 11, a first rotary motor 16 connected to the first arranging jig 12, for rotating the first arranging jig 12, a second arranging jig 13 located at a site facing the first arranging jig 12 and attached to an opposite surface of the coil spring 200 contacting the first arranging jig 12, a second arranging rod 13b connected to a second arranging unit, an arranging unit driving unit 14 fixed to the second arranging rod 13b and configured to move forwards and rearwards towards the coil spring 200, and an arranging unit ball screw 15 and an arranging unit servo motor 19 connected to the second arranging jig 13, for moving the arranging unit driving unit 14 forwards and rearwards. A first escape part 12a contacting a start part 200a that is a protrusion of the coil spring 200, for arranging the coil spring 200 is formed in the first arranging jig 12. In an embodiment of the present invention, two parts for arranging the coil spring 200 are exemplified, but the number of the parts for arranging the coil spring 200 may be smaller than or larger than two if necessary.

Figure 3:
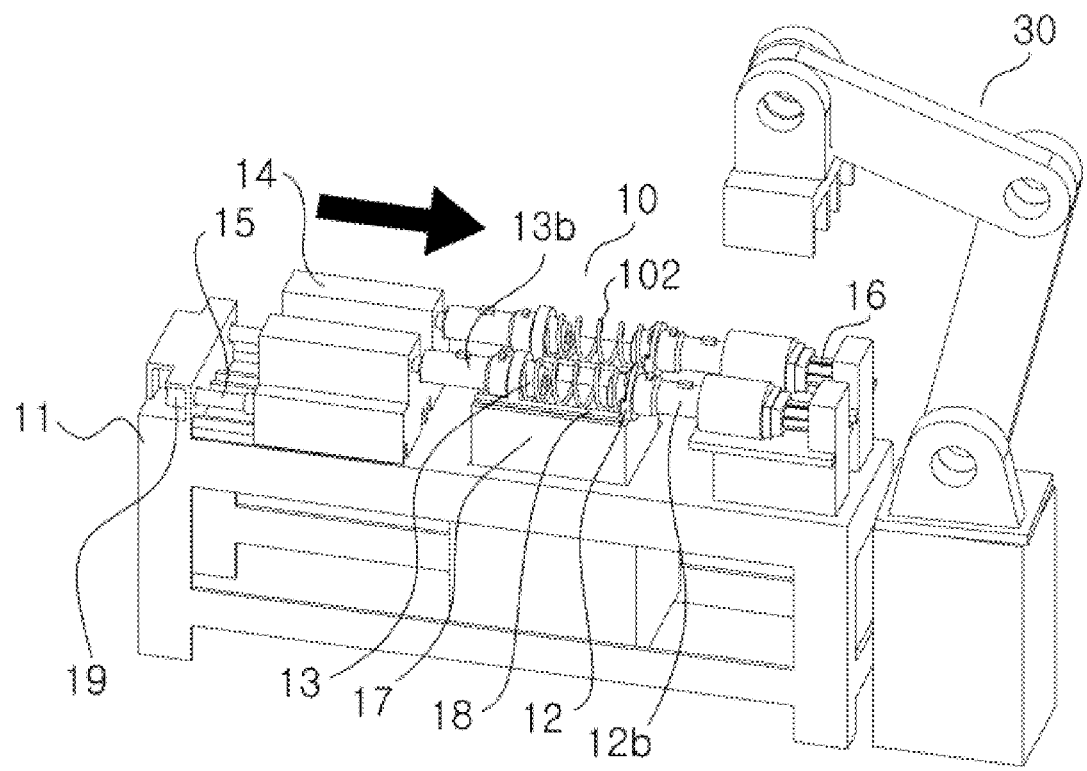
FIG. 3 is a perspective view illustrating driving of an arranging unit driving unit in an arranging apparatus of a laser marking system for coil springs according to an embodiment of the present invention.
Figure 4:
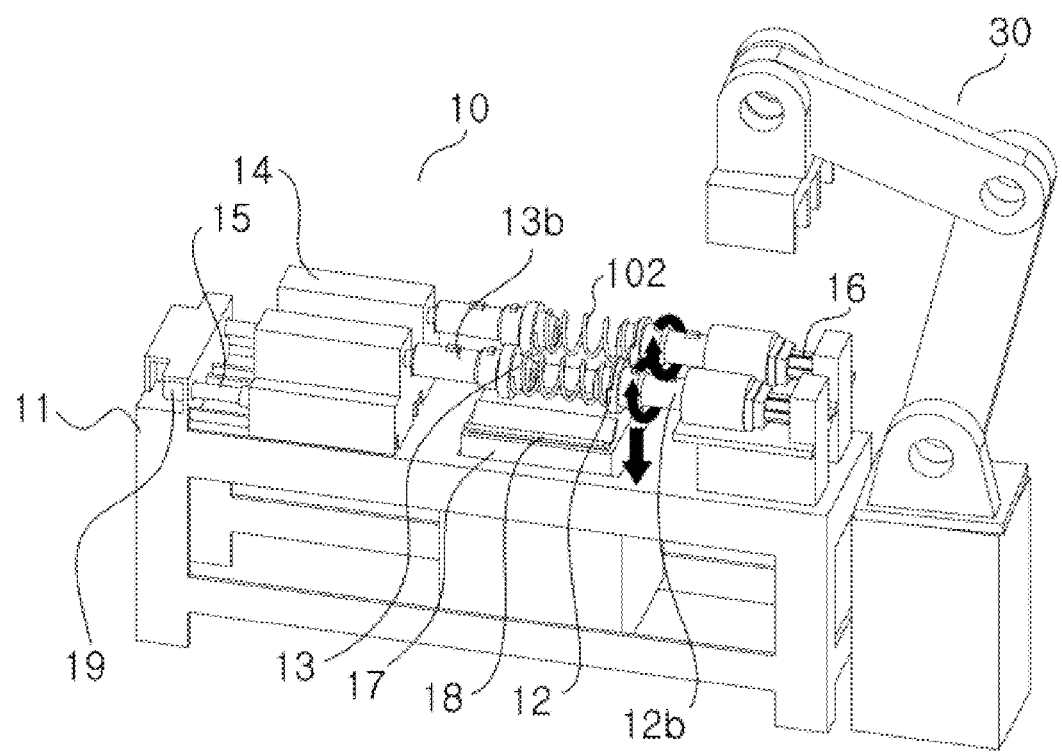
FIG. 4 is a perspective view illustrating rotation of an arranging jig in an arranging apparatus of a laser marking system for coil springs according to an embodiment of the present invention.
Figure 5:
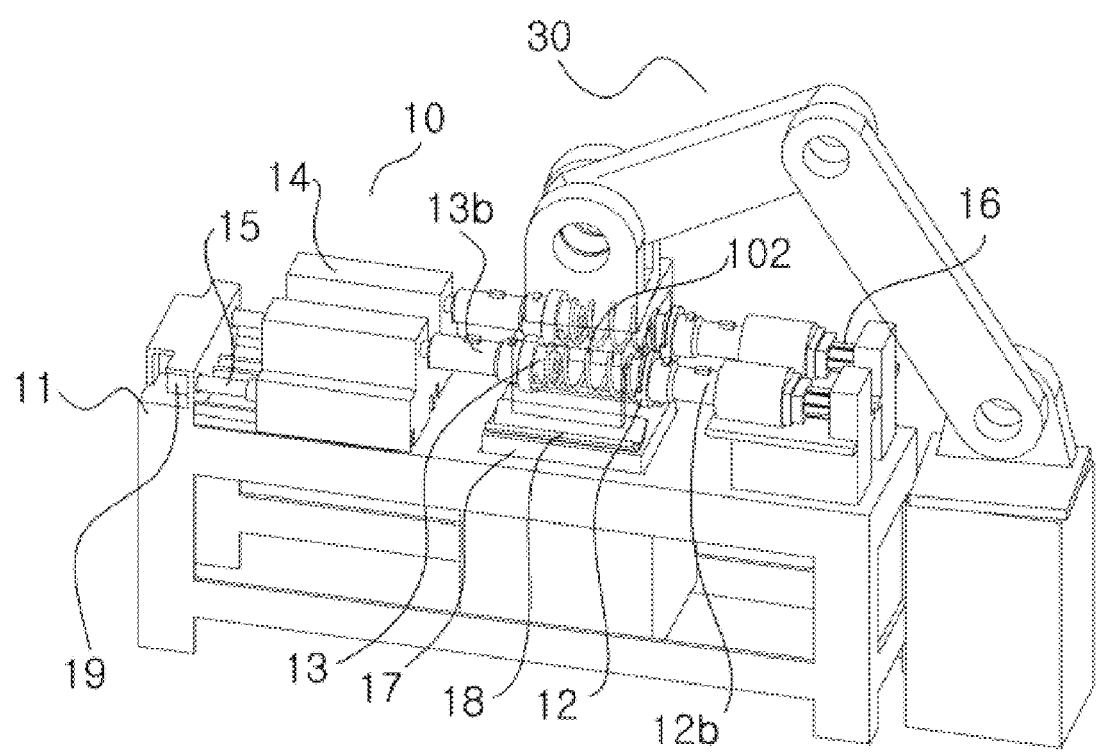
FIG. 5 is a perspective view illustrating that a coil spring is completely arranged in an arranging apparatus of a laser marking system for coil springs according to an embodiment of the present invention.
Figure 6:
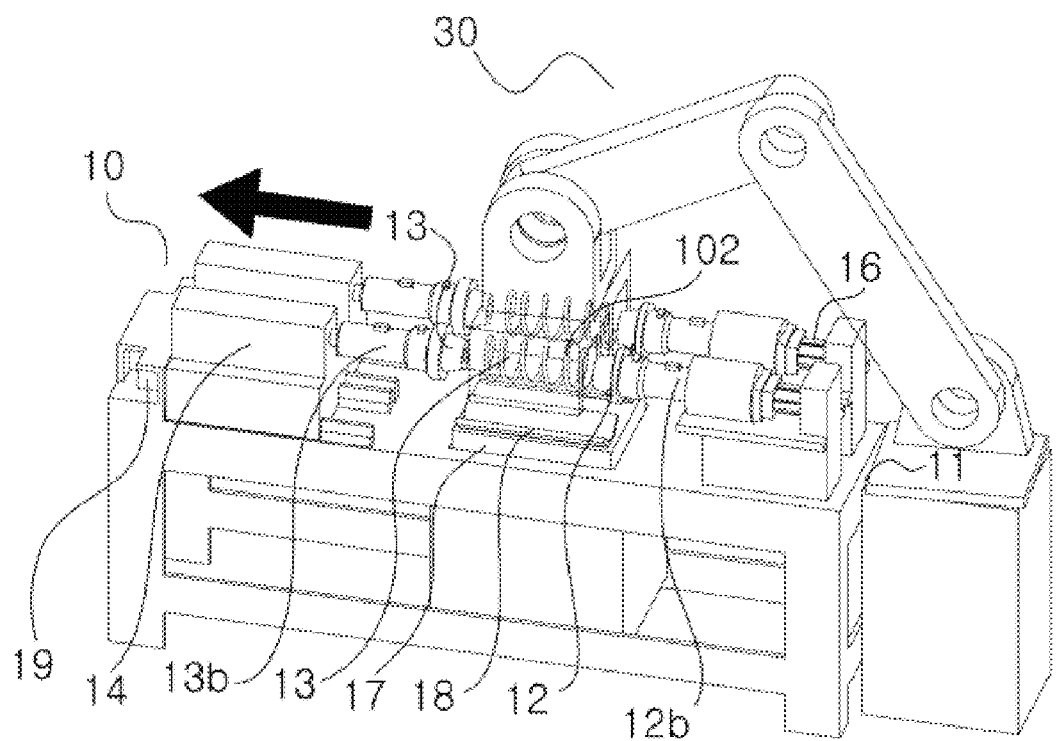
FIG. 6 is a perspective view illustrating that an arranging unit driving unit performs a driving operation after a coil spring is completely arranged in an arranging apparatus of a laser marking system for coil springs according to an embodiment of the present invention.
Figure 7:
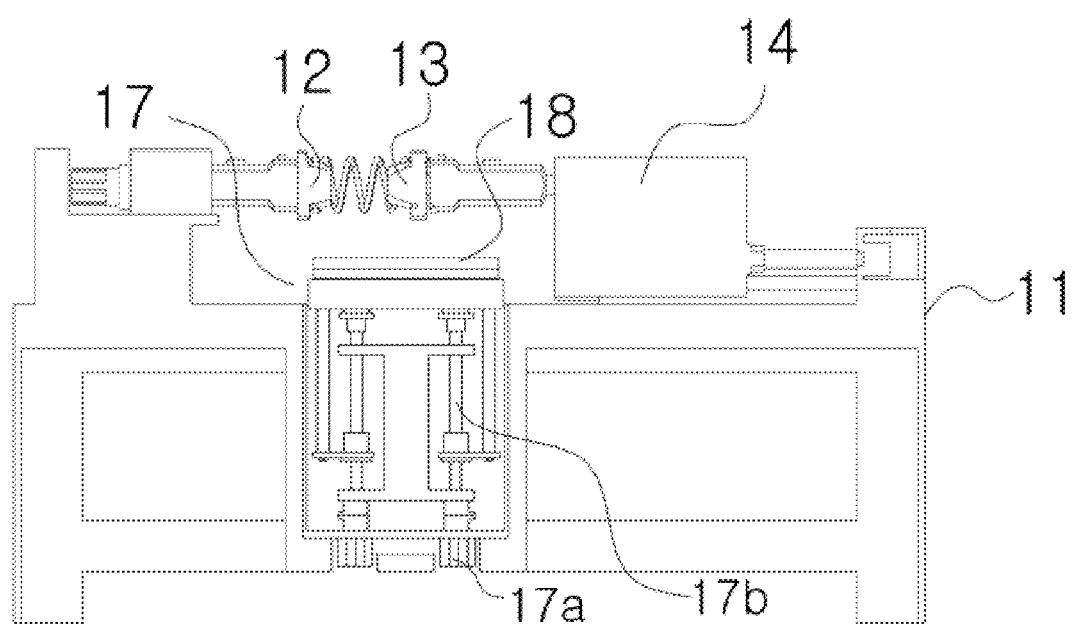
FIG. 7 is a sectional view illustrating a side surface of a positioning jig driving unit in an arranging apparatus of a laser marking system for coil springs according to an embodiment of the present invention.

A sequence of the operations of the arranging apparatus 10 according to an embodiment of the present invention is as follows. As illustrated in FIG. 2, if the coil spring 200 is positioned in the arranging unit positioning jig 18 by the feeding apparatus 30, the arranging unit driving unit 14 is moved towards the coil spring 200 as illustrated in FIG. 3 such that the first arranging jig 12 and the second arranging jig 13 are adhered to opposite surfaces of the coil spring 200 to fix the coil spring 200. If the coil spring 200 is fixed, the arranging unit positioning jig 18 is moved downwards to be separated from the coil spring 200 as illustrated in FIG. 4, and the first arranging jig 12 is rotated such that the first escape part 12a of the first arranging jig 12 contacts the start part 200a that is a protrusion of the coil spring 200. Then, the first arranging jig 12 is rotated in the same direction as the rotational direction of the coil spring 200. After the first escape part 12a contacts the start part 200a of the coil spring 200, the first arranging jig 12 is rotated to a location set to arrange the coil spring 200 according to an introduction direction of a coil spring 200 of the next process. After the coil spring 200 is completely arranged, the feeding apparatus 30 fixes the coil spring 200 as illustrated in FIG. 5, and the arranging unit driving unit 14 is moved away from the coil spring 200 as illustrated in FIG. 6 such that the first arranging jig 12 and the second arranging jig 13 attached to the coil spring 200 are separated from the coil spring 200 and the coil spring 200 fixed to the feeding apparatus 30 is moved to the marking apparatus 20.

Figure 10:
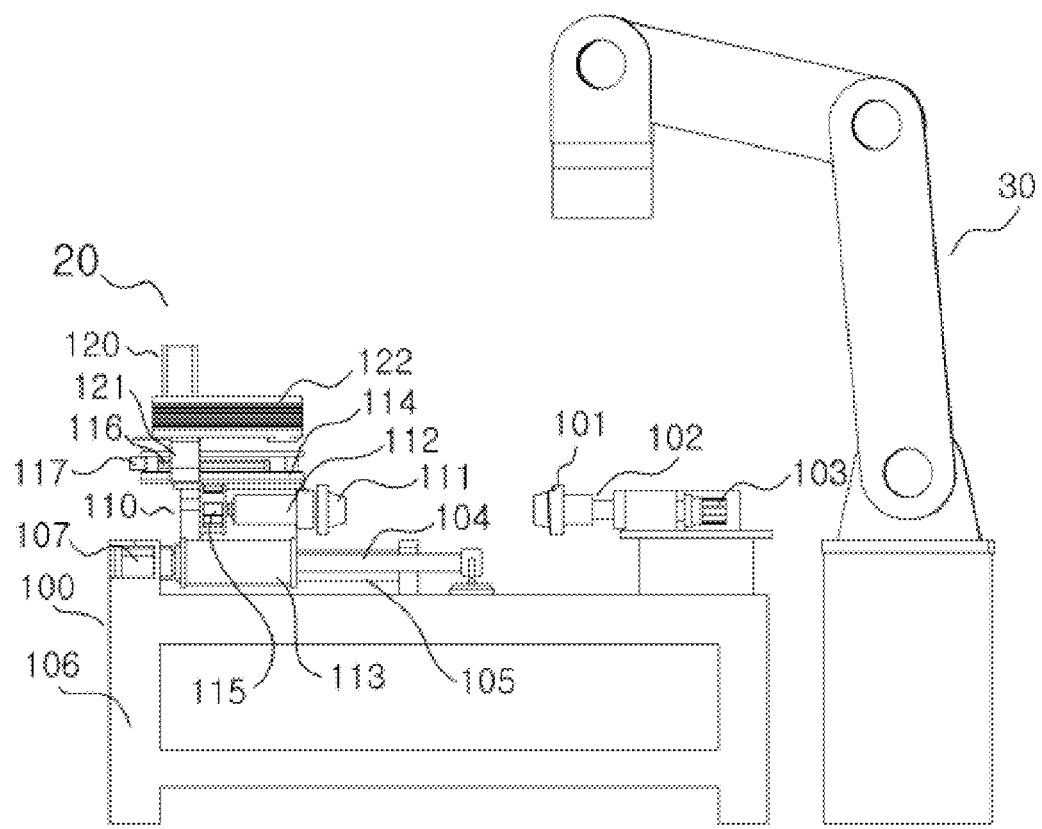
FIG. 10 is a side sectional view illustrating a marking apparatus and a feeding apparatus of a laser marking system for coil springs according to an embodiment of the present invention.
Figure 11:
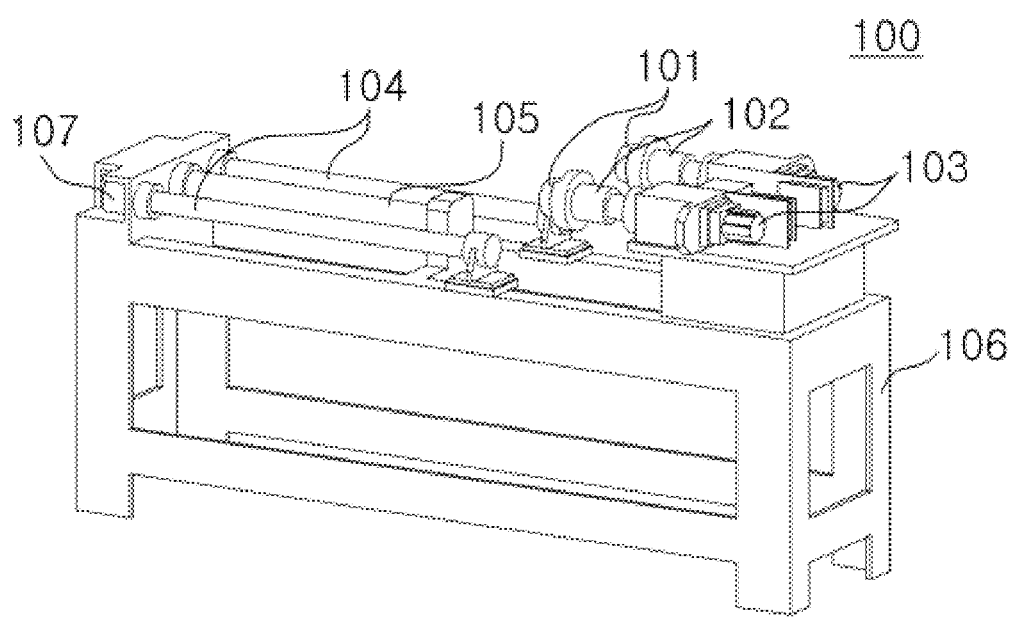
FIG. 11 is a perspective view illustrating a support unit in a marking apparatus of a laser marking system for coil springs according to an embodiment of the present invention.
Figure 12:
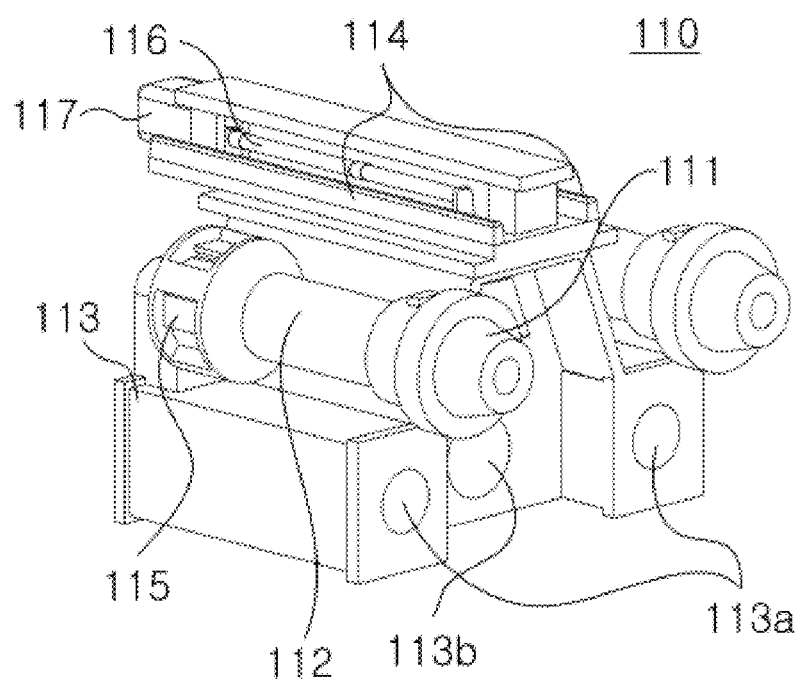
FIG. 12 is a perspective view illustrating a moving unit in a marking apparatus of a laser marking system for coil springs according to an embodiment of the present invention.

Referring to FIG. 10, the marking apparatus 20 includes a support unit 100, a moving unit 110, and a marking unit 120. Referring to FIG. 11, a support member 106 for supporting various parts is formed at a lower side of the support unit 100, and a moving unit shaft 104 for moving the moving unit 110 forwards and rearwards, a moving unit ball screw 105 for driving the moving unit 110 forwards and rearwards, and a moving unit servo motor 107 are coupled to an upper side of the support unit 100. A first fixing jig 101 for fixing the coil spring 200 and a first fixing rod 102 connected to the first fixing jig 101 and coupled to the support member 106 are coupled to a second rotary motor 103 connected to the first fixing rod 102, for rotating the first fixing rod 102 and the first fixing jig 101. Referring to FIG. 12, the first fixing jig 101 is configured such that a rotation start part 200a that is a protrusion on an end surface of the coil spring 200 contacts a second escape part 101a of the first fixing jig 101 to adjust a marking location of the coil spring 200, and the coil spring 200 is rotated together when the first fixing jig 101 is rotated. Then, the first fixing jig 101 is rotated along the rotational direction of the coil spring 200.

Referring to FIG. 12, the moving unit 110 includes a moving unit frame 113, a second fixing jig 111, a second fixing rod 112, a third rotary motor 115, and a marking unit shaft 114. A moving unit shaft 104 installed in the support unit 100 passes through a moving unit shaft coupling groove 113a installed at a lower side of the moving unit frame 113 and a moving unit ball screw 105 coupled to the support unit 100 is coupled to a moving unit screw coupling groove 113b such that the moving unit 110 is moved forwards and rearwards using the moving unit servo motor 107. A second fixing rod 112 is coupled to the moving unit frame 113, and a second fixing jig 111 is coupled to a front surface of the second fixing rod 112 to fix the coil spring 200 together with the first fixing jig 101. A third rotary motor 115 is coupled to a rear surface of the second fixing rod 112 to rotate the second fixing rod 112 and the second fixing jig 111. A marking unit shaft 114 for moving the marking unit 120 forwards and rearward and a marking unit ball screw 116 and a marking unit servo motor 117 for driving the marking unit 120 forwards and rearwards are coupled to an upper surface of the moving unit frame 113.

Figure 13:
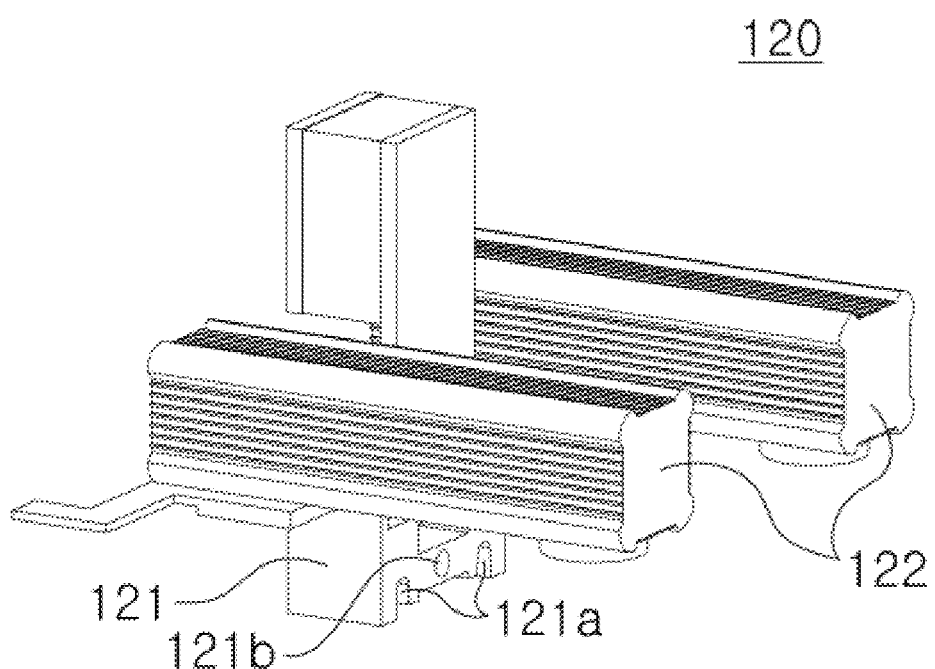
FIG. 13 is a perspective view illustrating a marking unit in a marking apparatus of a laser marking system for coil springs according to an embodiment of the present invention.

Referring to FIG. 13, the marking unit 120 includes a marking unit frame 121 and a laser marker 122. A marking unit shaft 114 formed at an upper side of the moving unit 110 passes through a marking unit shaft coupling groove 121a formed at a lower side of the marking unit frame 121 and the marking unit ball screw 116 coupled to the moving unit 110 is coupled to the marking unit screw coupling groove 121b such that the marking unit 120 is moved forwards and rearwards using the marking unit servo motor 117. If the coil spring 200 is fixed by the first fixing jig 101 and the second fixing jig 111, the marking unit 120 is moved forwards on an upper side of the moving unit 110 to be located to face a side surface of the coil spring 200, and a marking operation using the laser marker 122 is performed on a side surface of the coil spring 200. In an embodiment of the present invention, two parts for performing a laser marking operation on the coil spring 200 are exemplified, but the number of the parts for performing a laser marking operation may be smaller than or larger than two if necessary.

The sequence of the processes of the marking apparatus 20 according to the present invention is as follows.

Figure 14A:
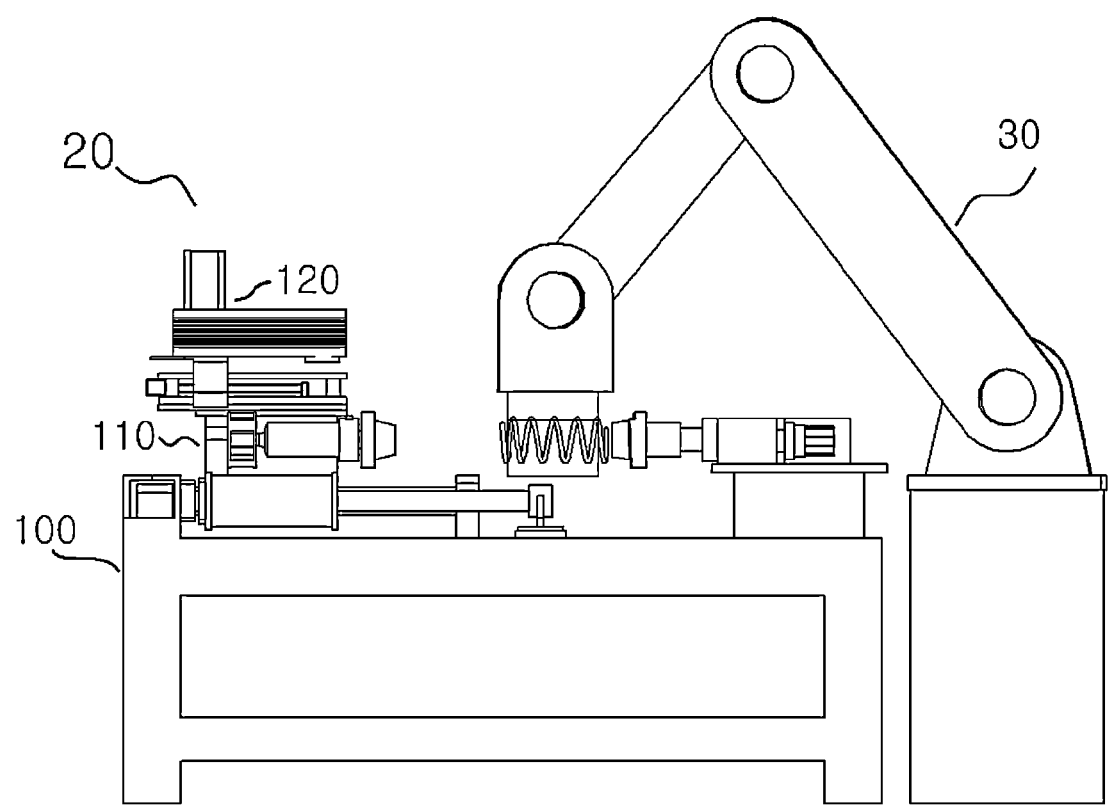
FIG. 14A is a side sectional view illustrating appearances of a marking apparatus and a feeding apparatus when a coil spring of a laser marking system for coil springs is moved by a robot arm according to an embodiment of the present invention.
Figure 14B:
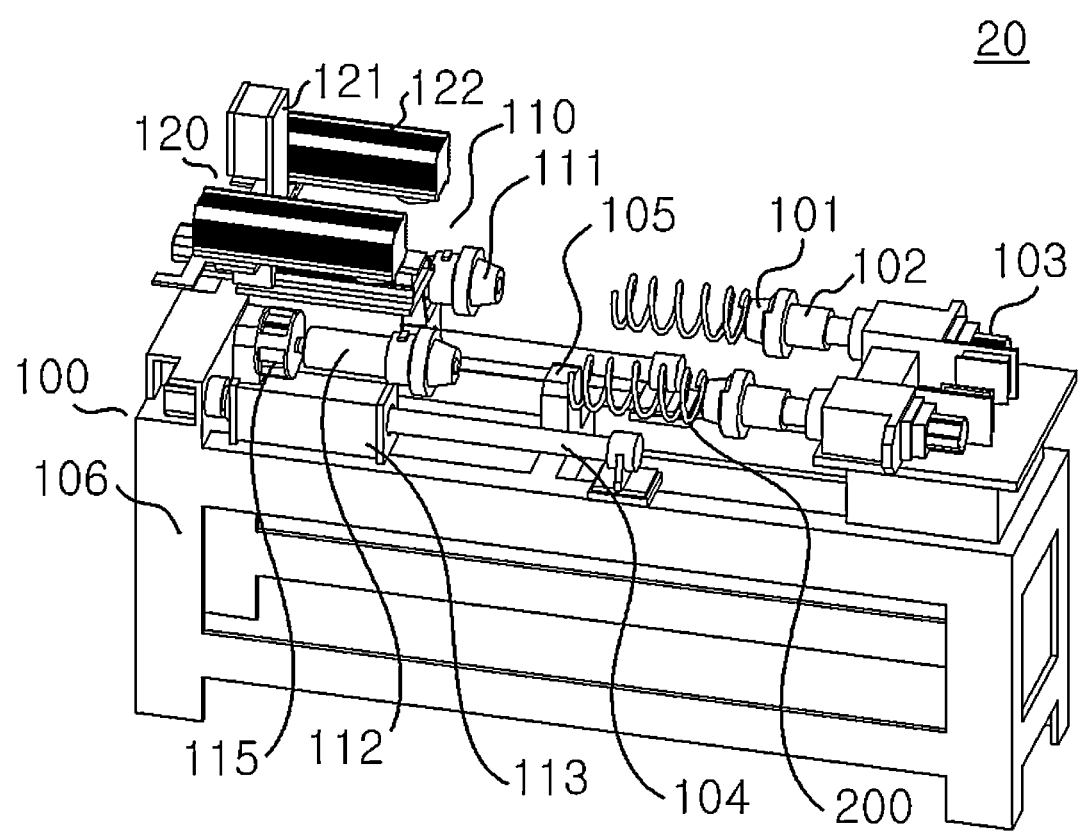
FIG. 14B is a perspective view illustrating a making apparatus when a coil spring of a laser marking system for coil springs is moved according to an embodiment of the present invention.
Figure 15A:
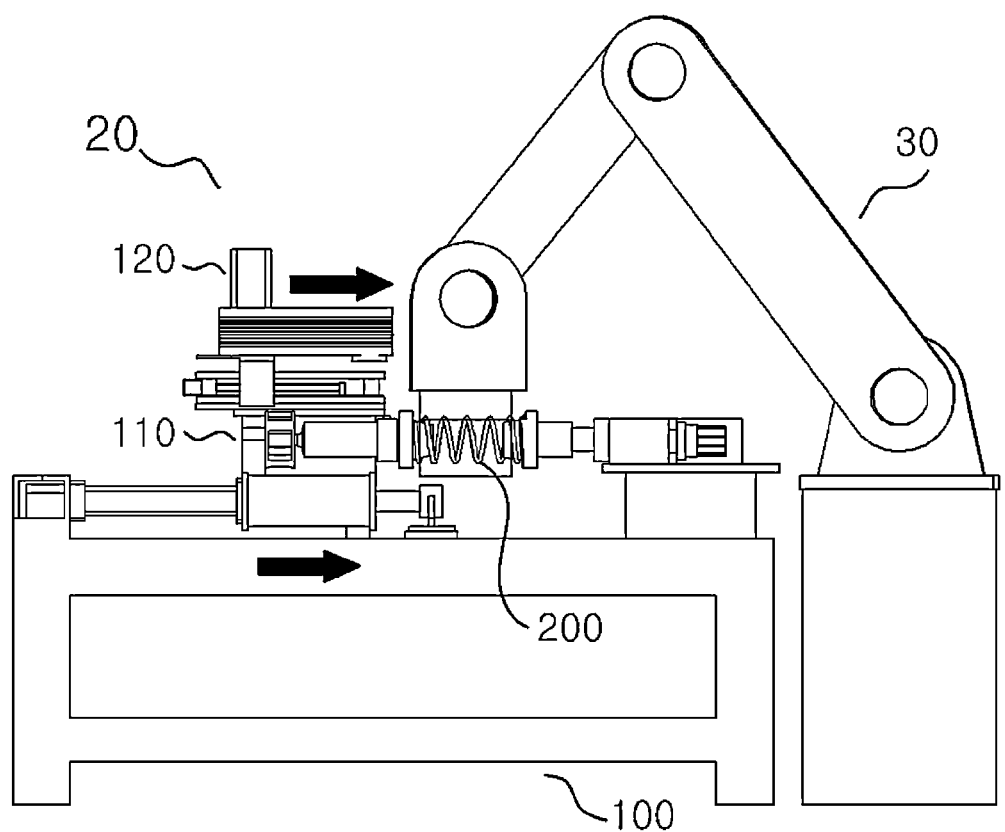
FIG. 15A is a side sectional view illustrating appearances of a marking apparatus and a feeding apparatus when a moving unit of a laser marking system for coil springs is moved according to an embodiment of the present invention.
Figure 15B:
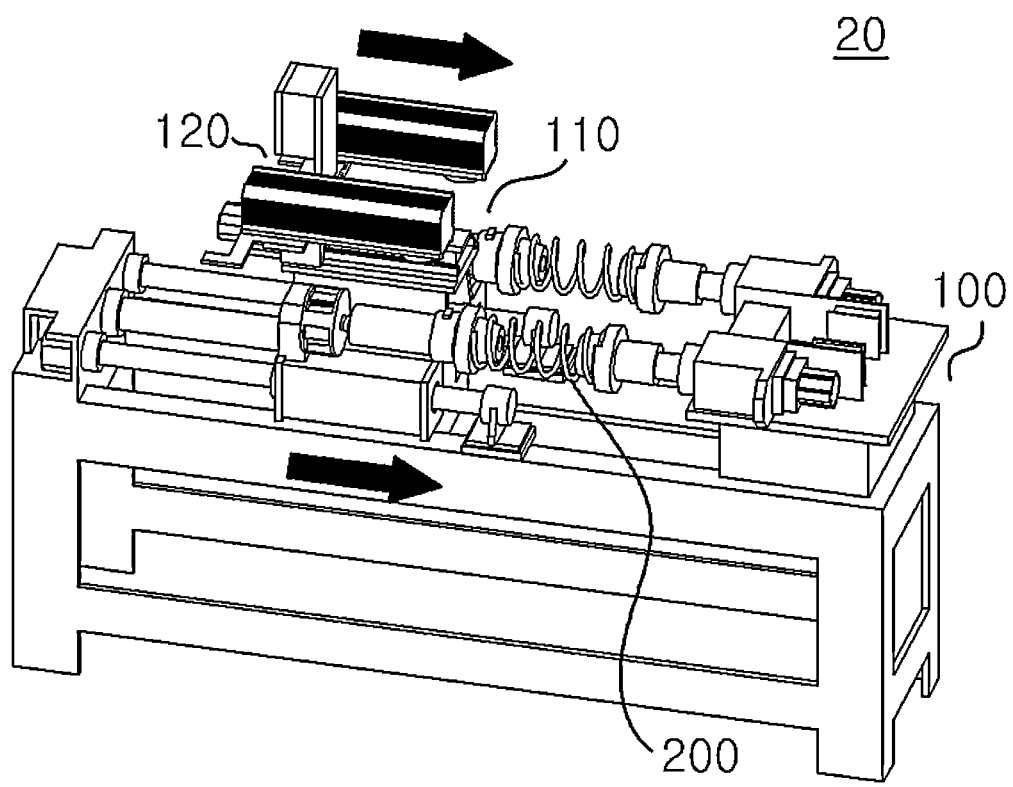
FIG. 15B is a perspective view illustrating a making apparatus when a moving unit of a laser marking system for coil springs is moved such that a coil spring is fixed according to an embodiment of the present invention.
Figure 16A:
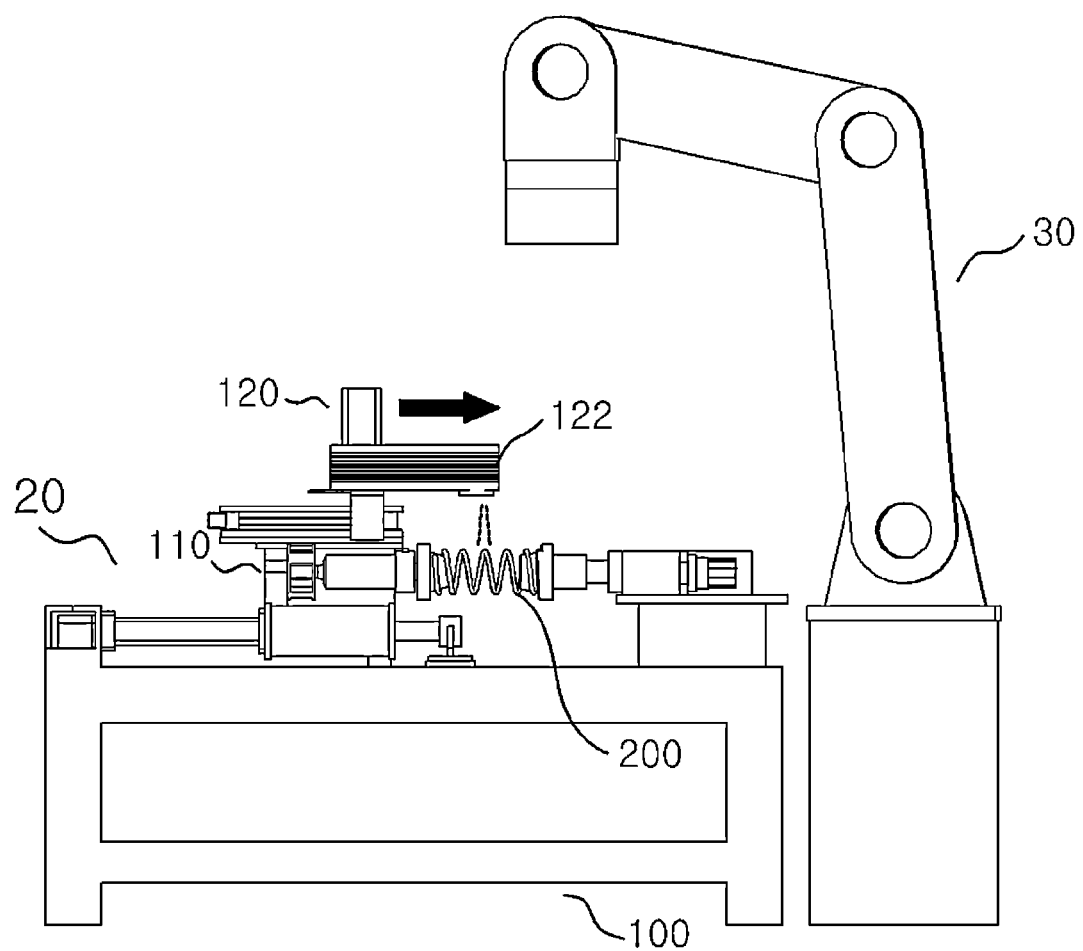
FIG. 16A is a side sectional view illustrating appearances of a marking apparatus and a feeding apparatus when a marking unit of a laser marking system for coil springs is moved to performing a marking operation on a coil spring according to an embodiment of the present invention.
Figure 16B:
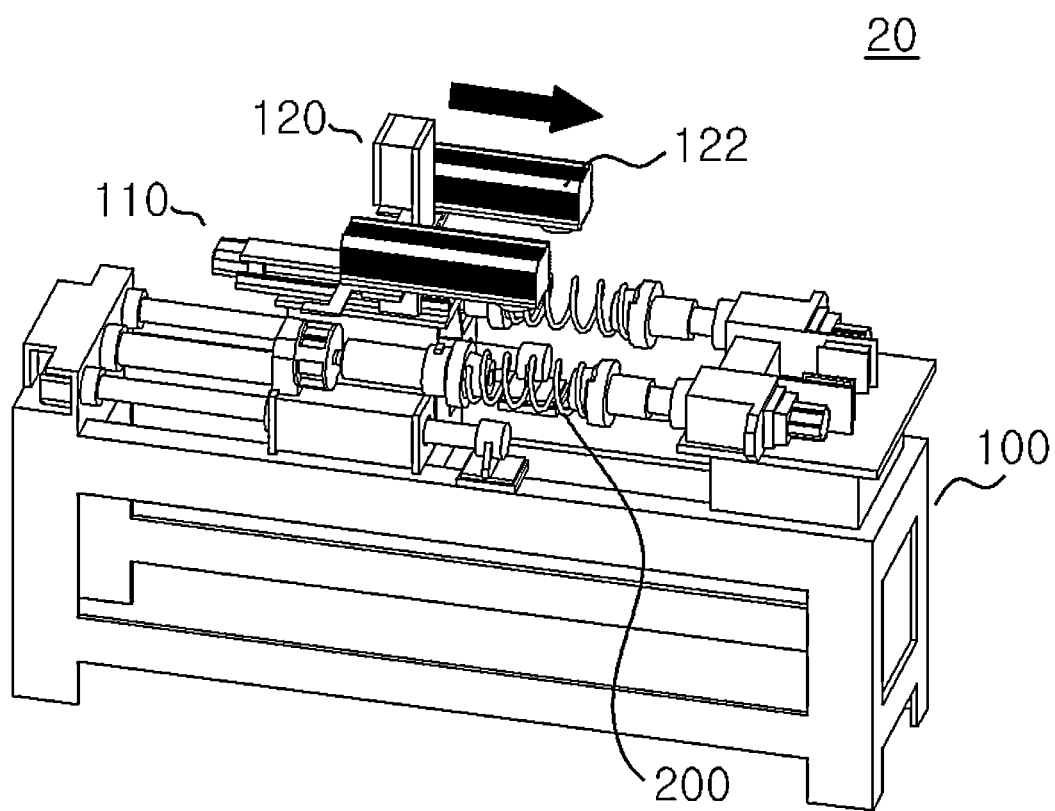
FIG. 16B is a perspective view illustrating a marking apparatus when a marking unit of a laser marking system for coil springs is moved to perform a marking operation on a coil spring according to an embodiment of the present invention.
Figure 17:
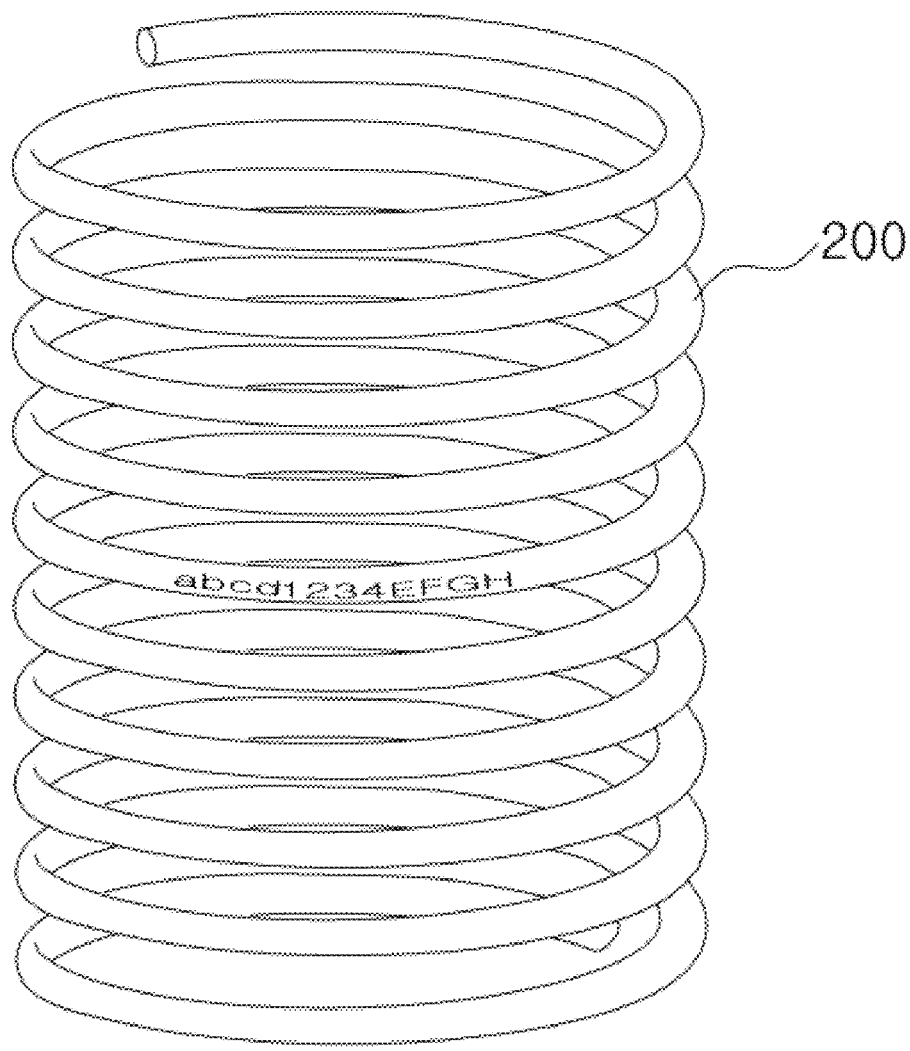
FIG. 17 is a perspective view illustrating a coil spring on which a marking operation is completely performed in a laser marking system for coil springs according to an embodiment of the present invention.
Figure 18:
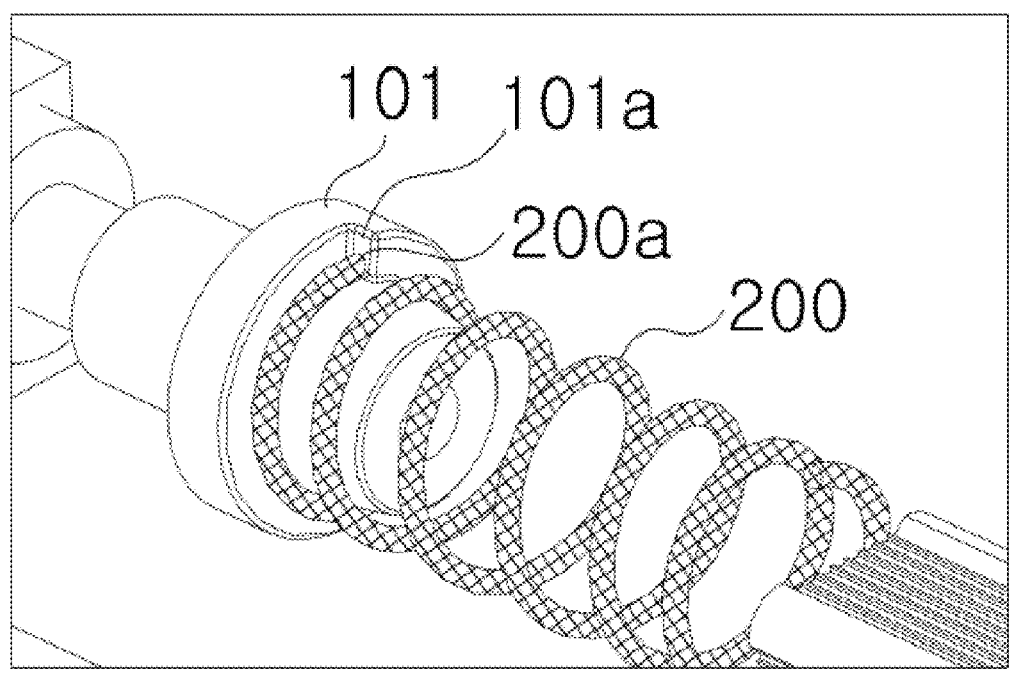
FIG. 18 is a perspective view illustrating a coil spring fixing unit in a support unit in a marking apparatus of a laser marking system for coil springs according to an embodiment of the present invention.

If the feeding apparatus 30 locates the coil spring 200 which has been completely arranged by the arranging apparatus 10 between the first fixing jig 101 of the fixing unit 100 and the second fixing jig 111 of the moving unit 110 as illustrated in FIGS. 14A and 14B, the moving unit 110 is moved towards the coil spring 200 to fix the coil spring 200 using the first fixing jig 101 and the second fixing jig 111 as illustrated in FIGS. 15A and 15B. Then, because the coil spring 200 is arranged by the arranging apparatus 10 and is fed, the coil spring 200 is fixed while the start part 200a of the coil spring 200 is located at a site where the start part 200a of the coil spring 200 contacts the second escape part 101a of the first fixing jig 101. If the coil spring 200 is fixed by the first fixing jig 101 and the second fixing jig 111, the feeding apparatus 30 that fixes the coil spring 200 is separated from the coil spring 200 while the coil spring 200 is left on the marking apparatus 20, and a marking location of the coil spring 200 is situated at a laser ejection location of the laser marker 122 by rotating the first fixing jig 101 and the second fixing jig 111 by a preset angle. Thereafter, as illustrated in FIGS. 16A and 16B, the marking unit 120 located on an upper side of the moving unit 110 moves towards the coil spring 200 on an upper side of the moving unit 110 such that a laser ejection hole of the laser marker 122 is moved to face a side surface of the coil spring 200, and letters and symbols are marked on a side surface of the coil spring 200. After the marking operation is completed and before the coil spring 200 is moved, the coil spring 200 is rotated using the first fixing jig 101 and the second fixing jig 111 such that the second escape part 101a of the first fixing jig 101 faces an upper side so that the coil spring 200 is not stopped by the second escape part 101a of the first fixing jig 101 while the coil spring 200 is moved. Thereafter, after the coil spring 200 is fixed using the feeding apparatus 30 and the marking unit 120 is moved away from the coil spring 200, the coil spring 200 is moved to the next process using the feeding apparatus 30 to which the coil spring 200 is fixed after the coil spring 200 is separated from the first fixing jig 101 and the second fixing jig 111. As illustrated in FIG. 16, the set letters and symbols appear on a side surface of the coil spring 200 on which the marking process has been completely performed.

The laser marking system for coil springs according to the present invention is not limited to the aforementioned embodiment, but may be variously modified without departing from the scope of the present invention which is defined in the claims.

What is claimed is:

1. A laser marking system for coil springs, the laser marking system comprising:
   an arranging apparatus including a positioning jig for positioning a coil spring, and a positioning jig driving unit configured to move the positioning jig upwards in such a way that the positioning jig places the coil spring at a predetermined position;
   a support unit including a moving unit shaft;
   a moving unit movably installed on the moving unit shaft of the support unit and including a marking unit shaft in parallel to the moving unit shaft, wherein the moving unit includes a moving unit shaft coupling groove into which the moving unit shaft is inserted;
   a first fixing jig installed on the support unit and configured to hold one end of the coil spring placed at the predetermined position;
   a second fixing jig installed on the moving unit and configured to move toward and away from the first fixing jig along the moving unit shaft, the second fixing jig being configured to hold the other end of the coil spring placed at the predetermined position, wherein the positioning jig driving unit is further configured to move the positioning jig downwards after the coil spring placed at the predetermined position is held by the first fixing jig and the second fixing jig; and
   a marking unit movably installed on the marking unit shaft of the moving unit, and including a laser marker, wherein the marking unit includes a marking unit shaft coupling groove into which the marking unit shaft is inserted, and the laser marker is configured to face a side surface of the coil spring placed at the predetermined position when the coil spring is held in place by the first fixing jig and the second fixing jig,
   wherein the support unit further includes a moving unit ball screw connected to the moving unit shaft and a moving unit servo motor connected to the moving unit ball screw to move the moving unit along the moving unit shaft, and
   the moving unit further includes a marking unit ball screw connected to the marking unit shaft and a marking unit servo motor connected to the marking unit ball screw to move the marking unit along the marking unit shaft.

2. The laser marking system of claim 1, further comprising a rotary motor coupled to the first fixing jig, for rotating the first fixing jig.

3. The laser marking system of claim 2, wherein the first fixing jig includes an escape part, and the escape part is configured to hold the one end of the coil spring when the first fixing jig rotates by the rotary motor.

* * * * *